Figure 1:
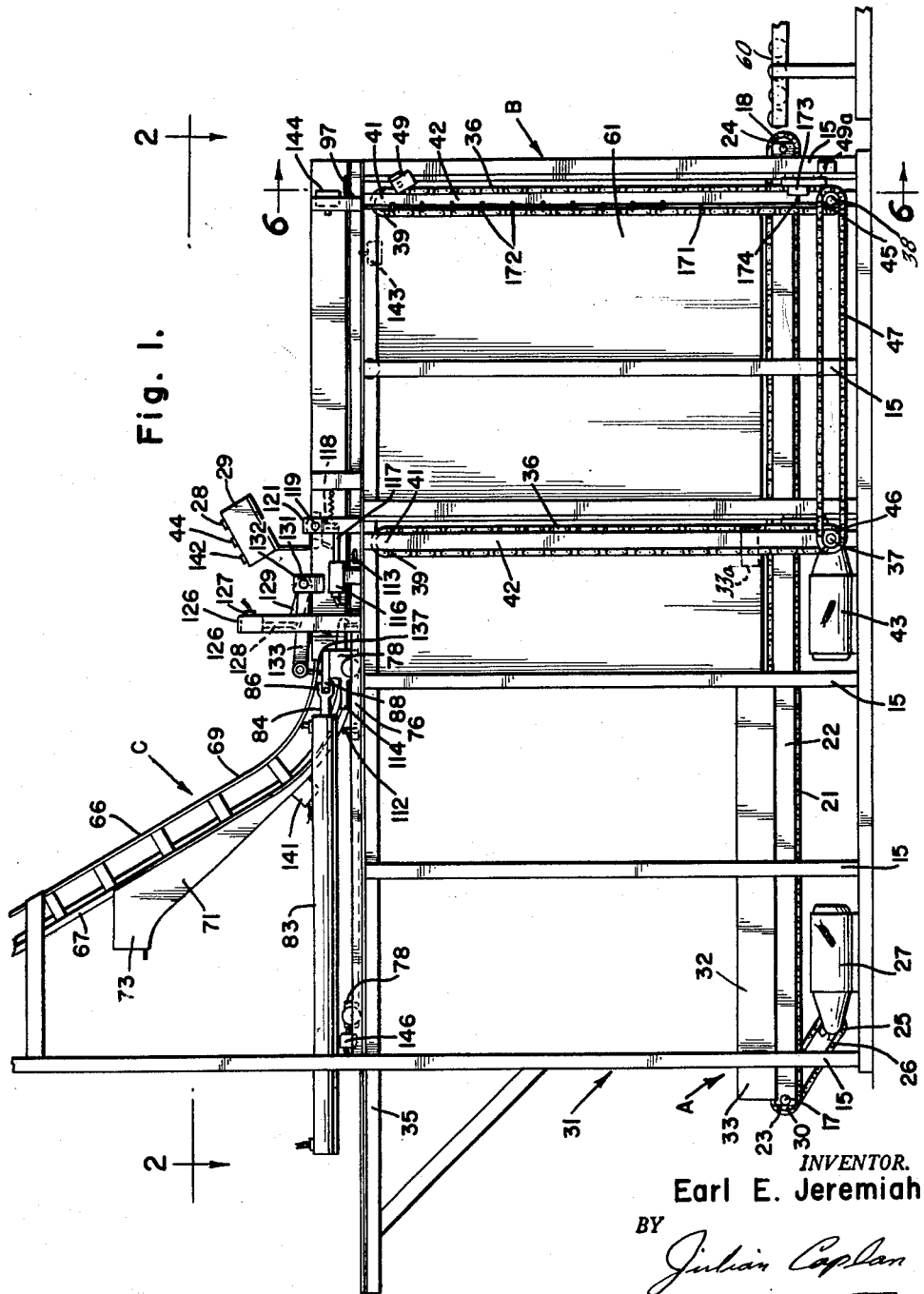

INVENTOR.
Earl E. Jeremiah
BY Julian Caplan
attorney

INVENTOR.
Earl E. Jeremiah

Jan. 19, 1965  E. E. JEREMIAH  3,166,203
CAN PALLETIZING MACHINE
Filed June 28, 1962  4 Sheets-Sheet 3
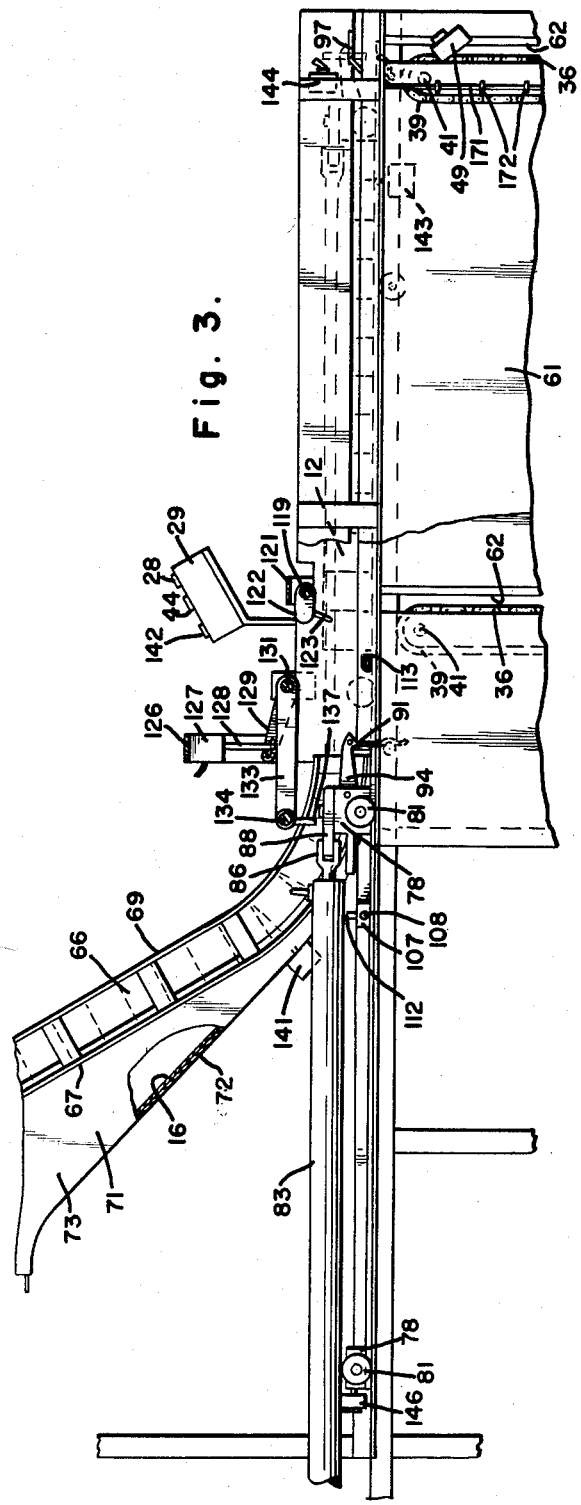
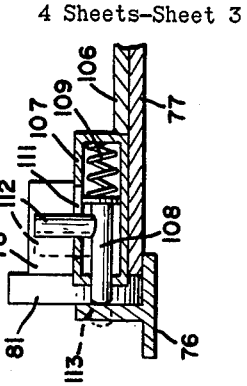
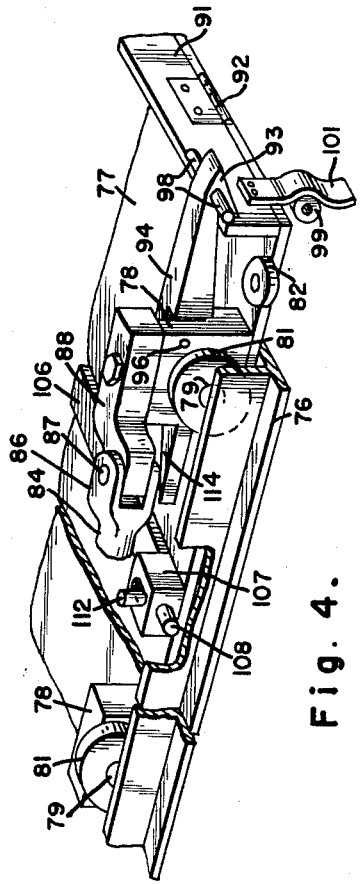
INVENTOR.
Earl E. Jeremiah
BY
Julian Caplan
attorney Jan. 19, 1965  E. E. JEREMIAH  3,166,203
CAN PALLETIZING MACHINE
Filed June 28, 1962  4 Sheets-Sheet 4

INVENTOR.
Earl E. Jeremiah
BY
Julian Caplan
attorney

United States Patent Office 3,166,203
Patented Jan. 19, 1965

3,166,203
CAN PALLETIZING MACHINE
Earl E. Jeremiah, Los Altos, Calif., assignor to National Can Corporation, Chicago, Ill., a corporation of Delaware
Filed June 28, 1962, Ser. No. 206,091
6 Claims. (Cl. 214—6)

This application is a continuation-in-part of my co-pending application, Serial No. 860,800, filed December 21, 1959, now abandoned.

This invention relates to a new and improved machine for palletizing cans and is characterized by the fact that an entire layer of cans (having the same width and length as the corresponding dimensions of the pallet) is fed onto the pallet or onto a separator placed on top of a layer of cans previously loaded on the pallet, and that thereafter succeeding layers of cans and separators are fed onto the pallet until the entire pallet is filled. After each layer is filled, the pallet is automatically depressed the height of one can so that the operation is semi-automatic.

The present invention relates to a means for reducing the labor cost in handling cans from the can factory to the vehicle in which they are to be transported to the cannery and from the vehicle into the cannery. For such purpose, instead of the cans being handled loosely and manually, cans are stacked on a pallet, a covering applied around the pallet, and the pallet conveniently moved by fork-lift truck from place to place until the pallet is unloaded.

Thus, in accordance with the present invention the cans are stacked in layers on a pallet whereupon they may be moved into a truck or freight car, transported to the cannery, then removed from the vehicle by a fork-lift truck to a warehouse and finally moved from the warehouse to the point at which they are to be filled. Heretofore, cans have commonly been handled by means of forks having a plurality of tines which fit into the open mouths of the can so that they are lifted to or from a conveyor into or from a stack. The present invention eliminates the manual labor involved in such operations.

One of the particular features of the present invention is the fact that the palletizing machine is simple in construction and yet operates at very high speeds, so that a single machine can palletize the output of several can lines.

One of the features of the present invention is the fact that cans are assembled in vertical or slanted chutes, having the width of the width of the pallet, and flow by gravity onto a moving plate which reciprocates from a retracted position to a projected position overhanging the pallet. Means is provided to cut off the discharge of cans from the chute when the required number to fill the length of the pallet has been discharged.

Further, means is provided to prevent the cans from moving back on the return stroke of the plate. It will thus been seen that a whole layer of cans is advanced by the plate into a position above the pallet and then stripped off so that the entire layer is deposited at one time.

Another feature of the invention is the provision of a hopper into which a paper or cardboard separator between layer of cans is loaded and which discharges onto the aforementioned plate underneath the cans so that the separator is moved out along with the cans as they are advanced by the plate.

A still further feature of the invention is the provision of adjustment means on the machine to accommodate cans of different diameters and of different heights.

Other objects of the present invention will become apparent upon reading the following specifications and referring to the accompanying drawings in which similar characters of reference represent corresponding parts in each of the several views.

Figure 2:
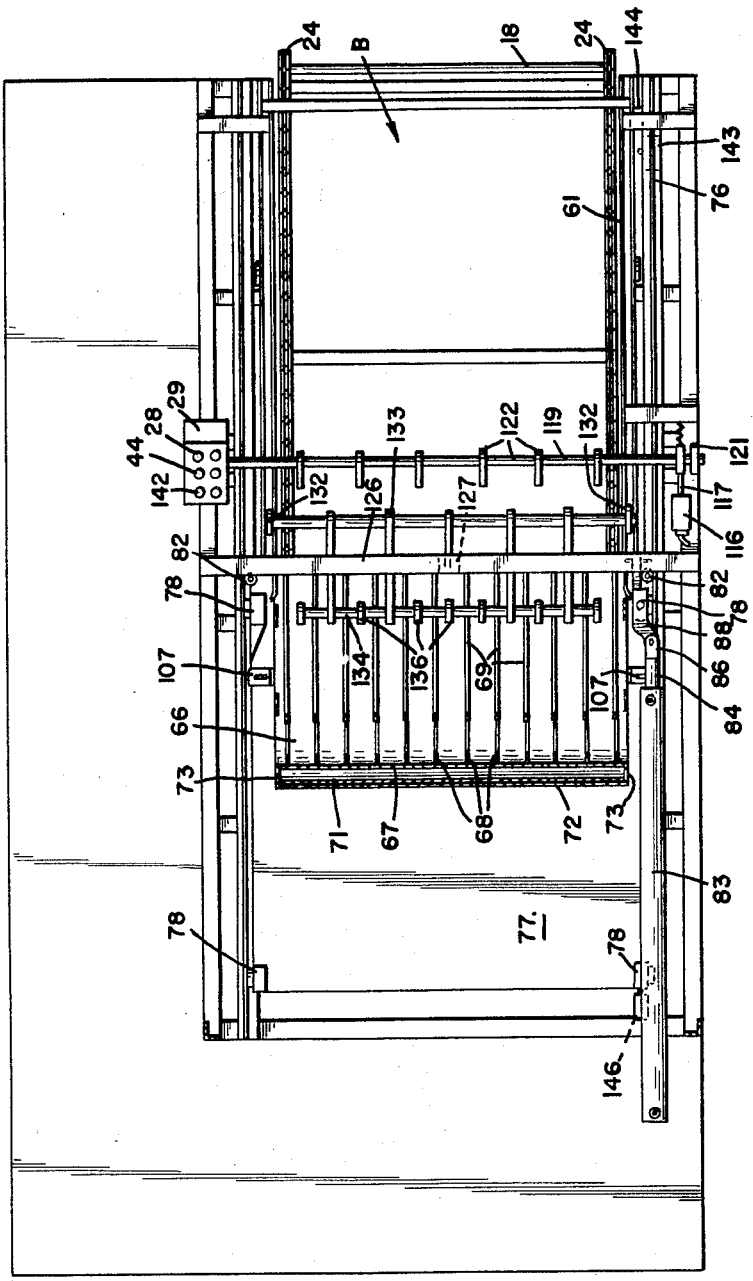
Figure 6:
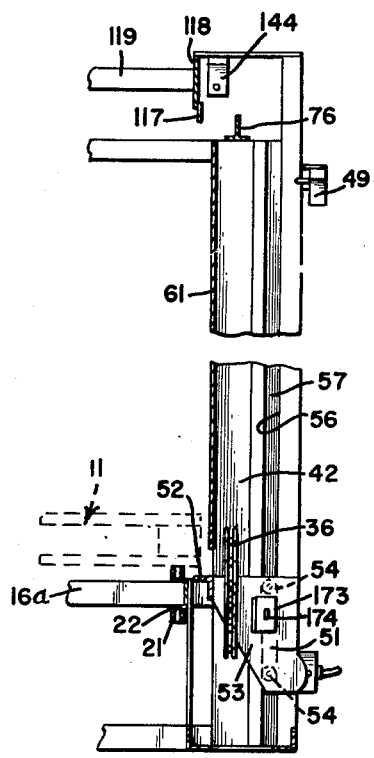
Figure 7:
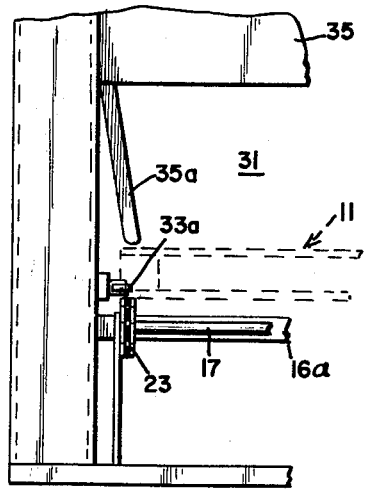
Figure 8:
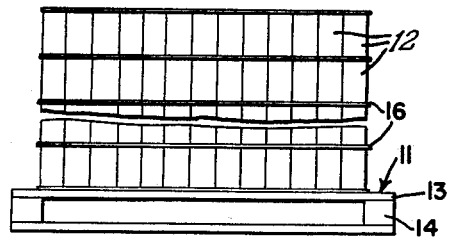

In the drawings:
FIG. 1 is a side elevation view of the machine.
FIG. 2 is a top plan thereof.
FIG. 3 is a fragmentary view of the can loading portion of the machine.
FIG. 4 is a fragmentary perspective view of a portion of the machine.
FIG. 5 is a sectional view through the stripper bar latch.
FIG. 6 is a fragmentary sectional view taken substantially along the line 6—6 of FIG. 1.
FIG. 7 is a fragmentary front elevational view.
FIG. 8 is a side elevation of a can pallet partly broken away to conserve space.

The present invention is used to load on a pallet 11 rows of metal cans 12. Pallet 11 consists essentially of a horizontal platform 13, which is supported above the floor by depending legs 14 which are spaced apart to accommodate the forks of a lift-truck, so that the pallet 11 and its contents may be transported from place to place.

Essentially, the present machine consists of a pallet horizontal transfer station A, a pallet elevating station B, and can loading station C.

The pallet transfer station A consists essentially of a pair of horizontally disposed continuous chains 21 on opposite sides of the machine which move in unison at the control of the operator and extend from the front of the machine to the rear thereof. On either side of the machine is a horizontal spacer bar 22 supported by vertical frame members 15 and held in parallel position by cross member 16a and in which are journalled front drive shaft 17 and rear idler shaft 18. Drive shaft 17 carries drive sprockets 23 and idler sprockets 24 are located on rear idler shaft 18. Shaft 17 and drive sprockets 23 are driven by motor 27 which is controlled by an appropriate switch button 28 at the control panel 29. Motor 27 turns sprocket 25, chain 26 and sprocket 30 on shaft 17. A stack of pallets is deposited in the space 31 at the front of the machine under operator's platform 35, and as the previous pallet is fed into the machine by longitudinal movement of chains 21, the next pallet drops down between the side guides 32 disposed vetrically on either side of the machine, the forward edges 33 of the side guides 32 flaring outwardly to facilitate ingress of the pallets when they are being loaded from a truck.

Depending bars 35a prevent more than one pallet from advancing into the machine. Chains 21 move forwardly the lowermost pallet from the pallet loading station A into the elevator station B. There is a limit switch 33a which stops the movement of chains 21 when the pallet has moved the required distance into the machine. Subsequently, after the pallet is fully loaded and deposited back on chains 21, the chains 21 move the filled pallet to the rear of the machine as the next empty pallet is brought from space 31 to the elevator station B.

The elevator station B consists of four vertically disposed continuous chains 36 which are driven by drive sprockets 37 on horizontal transversely extending drive shafts 38 at the bottom of the machine, and extend around idler sprockets 39 on horizontal transversely extending stub idler shafts 41 at the top of the machine. Shafts 38 and 41 are spaced apart by vertical spacer bars 42. To insure that the chains 36 move the same distance and at the same speed, they are driven from a reversible drive motor 43 controlled by button 44 at the control panel 29, which motor 43 drives sprocket 46 which in turn drives chain 47 which drives a sprocket 45 on the rearmost transverse shaft 38.

Rear shaft 38 has a sprocket (not shown) which drives a connecting chain (not shown) which in turn drives a sprocket (not shown) on the front shaft 37. Thus, as motor 43 turns the four chains 36 are moved in unison. Near the top of one of the bars 42 is a limit switch 49 which stops the movement of chains 36 when the pallet has been raised to its maximum height for the particular height can 12 being loaded. A further limit switch 49a stops the chains 36 on the return cycle when the pallet has been lowered the height of one can. Each chain 36 is connected to vertically slidable lifting member 51 which consists of an inwardly extending plate 53 having at its inner end angle bar 52 which slips under the platform 13 of the pallet 11. Plate 53 has a pair of rollers 54 which fit into a vertical groove 56 in vertical guide member 57. Since there is a lifter member 51 at each of the four corners of the pallet and since the chains 36 all move in unison, the pallet 11 is lifted and lowered and is at all times maintained horizontal.

To prevent cans from falling sideward off the pallet, sheet metal sides 61 are positioned on each side of the machine, the sides having vertical slots 62 through which lifter members 51 project.

Motor 43 is reversible so that after a layer of cans is deposited on the pallet 11, the chains 36 reverse a distance equivalent to the height of can 12, and this reversal movement is repeated until the pallet is completely filled, whereupon the pallet is lowered onto chains 21 and discharged to the rear of the machine.

Positioned on one of the sides 61 is a bar 171 to which are attached stops 172 spaced apart the height of one layer of cans. Stops 172 are adjustable in location so that the machine may be changed over for various heights. Fixed to one of the plates 53 is a switch 173 having a switch arm 174 which may contact stops 172. Thus, when the pallet is lowered after a layer has been loaded, motor 43 is energized until arm 174 contacts the next stop 172, whereupon motor 43 is de-energized.

When the pallet has been moved out from underneath the elevator station, it may be manually moved away as by means of roller conveyor 60 or may be removed by a lift-truck or other conveyance.

It is desirable that the filled pallet be encased in a jacket, such as pieces of corrugated paper bent at right angles and covering two sides of the pallet and by means of a cover. Conventional steel strapping, wire strapping, gummed paper or other means may be employed to hold the two halves of the cardboard jacket together and hold the jacket in place on the pallet. This prevents the cans from falling out of their stacks and also prevents exposure to dust, atmospheric conditions and other foreign materials.

At the loading station C, the cans 12 are pushed on to the pallet 11. Located slanting above and forwardly at the loading station is a chute 66 into which cans are fed from an overhead conveyor (not shown). The chute consisting of a slanted bottom 67 having a width substantially equal to the width of the pallet 11 and formed with a plurality of guides 68, each spaced from the adjacent guide a distance equal to the can diameter. Located above the chute bottom 67 are bars 69 which are parallel to bottom 67 and spaced therefrom a distance equal to the can height. The cans 12 are fed into the chute 66 and extend across the entire width thereof in parallel rows. Inasmuch as the chute 66 has considerable height, the weight of the cans tends to push the cans outwardly from the bottom of the chute.

Immediately below the chute 66 is a hopper 71 for separators 16, it being understood that there is a separator 16 between each layer of cans on the pallet. The separator hopper 71 has a curved bottom 72 generally parallel to chute bottom 67 and sides 73 so that its cross-sectional shape, as shown best in FIG. 2, is rectangular. Hopper 71 discharges at the bottom of chute 66.

Mounted below the chute 66 on either side of the machine and extending horizontally are T-shaped tracks 76 having an extended length from a point well forward of the elevator B and extending to a terminus immediately above the rearward end of the elevator. Reciprocating horizontally on tracks 76 is a plate 77 which has a cross-sectional shape equal to that of the pallet 11 and carries in each of its four corners a block 78 on which is mounted by means of horizontal axle 79 a roller 81 which rolls upon track 76. Further to guide the plate 77 in its movement, rollers 82 having vertical axles are positioned at the forward end of the plate 77 to ride upon the vertical flange of track 76. Tracks 76 confine plate 77 to horizontal reciprocation in a forward-rearward direction. Reciprocation of plate 77 is actuated by pneumatic cylinder 83 mounted on the side of the machine at the forward end thereof. The piston rod 84 of cylinder 83 is formed in a clevis 86 which is attached by means of pin 87 to laterally offset extension 88 attached to right hand forwardmost block 78.

In the retracted position of plate 77, as shown in FIG. 3, the rearward edge of the plate is immediately under the discharge point of the separator hopper 71 and of the chute 66. Thus, when a separator 16 is positioned in a hopper 71, it slides down to a position between the bottom of the chute 66 and the plate 77. When cans are discharged from the chute 66, as hereinafter appears, they slide under the force of the weight of the cans above them onto the separator 16 and the separator 16 is frictionally gripped between the cans and the plate 77. Hence, when the plate 77 is projected toward rearward position the cans and separator move therewith.

Along the rearward end of plate 77 is a gate 91 which is hinged thereto by means of hinges 92 about a horizontal transverse axis. Gate 91 is held in upright position, as shown in FIG. 4, by dog 93 on latch 94 which is pivoted by means of pin 96 to the righthand outermost block 78. At the extreme rearward end of righthand track 76 is a ramp 97 which engages laterally extending pin 98 on dog 93 and lifts the dog so that on the retractive stroke of the plate 77 the gate 91 is dropped. At the forward end of the travel of plate 77 is a roller 99 below the level of track 76 which engages downwardly projecting finger 101 on gate 91 and forces the gate to upright position, as shown in FIG. 4, whereupon the latch 94 engages the gate and holds it upright for the subsequent projected stroke of the plate.

Also associated with plate 77 is a stripper bar 106 which extends the width of the plate. At either end, stripper bar 106 is formed with a block 107 in which is a lock pin 108 projecting laterally outwardly and biased in such direction by spring 109. Connected to pin 108 and extending upwardly through laterally elongated slot 111 is an unlatching pin 112 which controls the inward and outward movement of latch pin 108. Positioned in the vertical flange of track 76 on either side of the machine immediately forwardly of the elevator B is a slot 113 through which latch pin 108 may project, and when so projected lock the stripper bar 106 in place. Righthand rearwardmost block 78 carries on its forward edge an inwardly slanted cam 114 which on the retractive stroke of the plate 77 engages unlatching pin 112 and pulls latch pin 108 inwardly against the force of spring 109 so that it is disengaged from slot 113. The function of stripper bar 106 and latch pin 108 is such that in the position of rest the stripper bar 106 is behind the discharge end of the chute 66. As the plate 77 projects, the forwardmost blocks 78 comprise bumpers which engage blocks 107 on stripper bar 106 and move it rearwardly until latch pins 108 engage slots 113 and lock the stripper bar in place. Thereafter for a portion of the retractive stroke of the plate 77, the stripper bar 106 remains stationary and prevents retractive movement of the cans and of the paper separator under the cans when the plate retracts until cam 114 engages the unlatching pin and releases the stripper bar 106. Thereafter, bar 106 returns to the initial position shown in FIG. 3.

Cooperating with stripper bar 106 is a solenoid 116 located on the side of the machine and having its armature 117 connected to crank 118 on transverse shaft 119 which extends across the machine and is supported by brackets 121 at either end. Shaft 119 has forwardly extending links 122 from which depend curved pins 123. In the normal position of the machine, the pins 123 are elevated above the cans resting on plate 77. However, when solenoid 116 is energized, pins 123 are depressed and enter into the open ends of the cans in the forwardmost row and prevent these cans from moving in a forward direction when the plate 77 retracts.

Located extending across the width of the machine at the discharge end of the chute 66 is a bridge 126 on the underside of the horizontal member of which is a solenoid 127 having a downwardly projecting armature 128 which is connected by a slot and pin connection to crank 129 on transverse shaft 131, the outer ends of which are journalled by means of brackets 132 to the frame of the machine. Projecting forwardly from shaft 131 are arms 133 which support transverse bar 134 having collars 136 from which depend pins 137. The collars 136 and pins 137 are located intermediate the guides 68. When solenoid 127 is energized, crank 129 is turned in a counterclockwise direction which depresses pins 137 and blocks off the discharge of cans from chute 66. Correspondingly, when the solenoid 127 is de-energized, the pins 137 are raised from the position shown in FIG. 3, permitting the cans to flow by gravity out of the chute 66 and onto the plate 77.

In operation, a stack of pallets 11 is deposited in the space 31. The operator pushes button 28 which advances the lowermost pallet 11 along chains 21 from the pallet loading station A to the elevator station B. When the pallet has reached this position, limit switch 33a causes the lifter members 51 to raise the pallet off the chains 21 and up to the top of the elevator portion of the machine, whereupon the chains 36 are stopped by limit switch 49. At this interval in the cycle of operation, plate 77 is retracted, pins 137 are depressed, thereby holding the cans from discharge from the chute 66 and gate 91 is latched in upright position. The operator inserts a separator 16 in the hopper 71 and when this separator is in position, switch 141 located on bottom 72 is closed, which permits the machine to operate. The operator then pushes button 142 which starts the cycle of operation. Solenoid 127 is energized thereby, retracting pins 137 and permitting discharge of cans from the chute 66. Thereupon, cylinder 83 is energized pushing the plate 77 along the tracks 76, the gate 91 preventing the cans from moving ahead of the plate, and thus a layer of cans 12 superimposed upon the separator 16 is pushed on the plate 77 across the top of the pallet 11.

As plate 77 nears the midpoint of its stroke, bumpers 78 engage blocks 107 and push stripper bar 106 over separator 16 until latch pin 108 seats in slot 113 at the limit of the stroke of the plate 77. When plate 77 reaches switch 143, solenoid 127 is de-energized which lowers the pins 137 and stops the discharge of cans from the chute 66. Between the interval when pins 137 are lowered and plate 77 reaches the limit of its rearward movement, stripper bar 106 pushes the cans for travel along with plate 77. At the limit of the movement of plate 77 is a switch 144 which reverses cylinder 83 and plate 77, and immediately prior to this reversal, latch 94 is unlatched by ramp 97 so that gate 91 assumes horizontal position. Stripper bar 106 remains in place, thereby preventing the separator 16 from returning with plate 77 and bar is eventually unlatched by cam 114 contacting unlatching pin 112. Release of bar 106 also closes a switch (not shown) to energize solenoid 116 to depress pins 123, preventing the cans from retracting with the plate and hence causing the cans to be pushed off the plate and onto the pallet or the topmost layer of cans on the pallet. Pins 123 prevent the cans from toppling over as the plate 77 finishes its return movement.

At the end of the return movement of plate 77, finger 101 contacts roller 99, which moves gate 91 to vertical position, and the gate is latched in such position by dog 93 on latch 94. Also, right forwardmost block 78 contacts limit switch 146 which recycles the operation of the machine. The motor 43 is energized which depresses the pallet the height of one can as is regulated by the stops 72. Assuming that a separator 16 has been inserted in hopper 71, and accordingly, switch 141 has been closed, the next cycle of operation commences.

The cans are loaded layer by layer until the pallet is full, whereupon the operator presses button 41 which lowers the pallet to the level of chains 21. Thereafter, button 44 is pressed, which moves the filled pallet rearwardly and an empty pallet into the elevator station B.

What is claimed is:

1. In a can palletizing machine, a horizontal conveyor for moving a pallet from a first position to a second position rearward of said first position, an elevator for raising said pallet upwardly from said second position and then lowering said pallet to said second position in increments, and a can loading mechanism at the top of said elevator, a plate, means for reciprocating said plate across the top of said elevator, a chute for cans discharging cans on to said plate terminating displaced from said second position, said plate in its retracted position being under said chute and in its projected position over said elevator, means for inserting a separator between said cans discharged from said chute and said plate, first means for retaining cans in position above said elevator as said plate is withdrawn to deposit a layer of cans on said pallet, and stripper means comprising a stripper bar resting upon and extending transversely across said plate, said stripper bar being movable with said plate between a retracted position forward of the lower end of said chute and a projected position approximately over the rearward edge of said elevator, first latch means on said stripper bar, second latch means on said can loading mechanism co-operable with said first latch means to hold said stripper bar in projected position stationary relative to said plate, unlatching means movable with said plate to disengage said first and second latch means when said plate has been withdrawn to a position adjacent but spaced from its retracted position, and second means for retaining cans in position above said elevator during the interval between unlatching of said stripper bar and completion of movement of said plate to retracted position.

2. A machine according to claim 1 which further comprises a hopper for inserting a separator between said cans discharged from said chute and said plate, said hopper having a curved bottom substantially parallel to and below said chute and having an enlarged opening at its upper end for manual insertion of separators and a restricted opening across the width of said machine at its lower end at the bottom of said chute and in close proximity to said plate.

3. A machine according to claim 1 which further comprises a plurality of pins movable between a projected position obstructing discharge of cans from said chute to a retracted position, means mounting said pins for movement between projected and retracted positions, electrical means controlling movement of said pins, and switch means responsive to movement of said plate for energizing and de-energizing said electrical means.

4. A machine according to claim 1 in which said second means for retaining cans comprises a plurality of pins, means mounting said pins for movement between down and up positions, means for moving said pins between down and up positions, and means actuated by movement of said plate for controlling said last mentioned means to move said pins to down position to block retractive movement of said cans in the interval between unlatching of said stripper bar and the end of retractive movement of said plate and to move said pins to up position at all other times.

5. A can palletizing means comprising an elevator for raising a pallet upward and then lowering said pallet in increments, and a can loading mechanism at the top of said elevator, means for inserting a separator between said cans discharged from said chute and said plate, means for reciprocating said plate across the top of said elevator, a chute for cans discharging cans on to said plate terminating displaced from said elevator, said plate in its retracted position being under said chute and in its projected position over said elevator, means for retaining cans in position above said elevator as said plate is withdrawn to deposit a layer of cans on said pallet, and stripper means comprising a stripper bar resting upon and extending transversely across said plate, said stripper bar being movable with said plate between a retracted position forward of the lower end of said chute and a projected position approximately over the rearward edge of said elevator, first latch means on said stripper bar, second latch means on said can loading mechanism cooperable with said first latch means to hold said stripper bar in projected position stationary relative to said plate, unlatching means movable with said plate to disengage said first and second latch means when said plate has been withdrawn to a position adjacent but spaced from its retracted position, and means for retaining cans in position above said elevator during the interval between unlatching of said stripper bar and completion of movement of said plate to retracted position.

6. A can palletizing machine comprising an elevator for raising a pallet upward and then lowering said pallet in increments, a horizontally reciprocable plate above said elevator, a chute for cans discharging cans by gravity onto said plate, said plate in retracted position being under said chute and in projected position over said elevator, a hopper below said chute having a filler opening for insertion of separators and a discharge opening across the width of said machine at the bottom of said chute in close proximity to said plate for inserting a separator between said cans discharged from said chute and said plate, means for reciprocating said plate across the top of said elevator with a separator and a layer of cans on top of said separator, means for retaining said layer of cans and separator in position above said elevator as said plate is withdrawn to deposit said separator and layer of cans on said pallet, said last named means comprising a stripper bar slidable on said plate between a retracted position forwardly of said chute and a projected position at the forward edge of said elevator station, latch means latching said stripper bar in projected position, means on said plate for projecting said stripper bar from retracted position, and means on said plate for disengaging said latch means.

References Cited by the Examiner
UNITED STATES PATENTS

| | | |
|---|---|---|
| 2,639,823 | 5/53 | Madden. |
| 2,701,650 | 2/55 | Stevenson. |
| 2,774,489 | 12/56 | Guigas. |
| 2,891,361 | 6/59 | Walter _____ 53—157 X |

HUGO O. SCHULZ, *Primary Examiner.*

MORRIS TEMIN, *Examiner.*